United States Patent
Liao et al.

(10) Patent No.: US 10,566,583 B2
(45) Date of Patent: Feb. 18, 2020

(54) ALUMINUM PLASTIC FILM PACKAGING MATERIAL FOR USE IN LITHIUM BATTERY TO PROLONG SERVICE LIFE

(71) Applicant: NAN YA PLASTICS CORPORATION, Taipei (TW)

(72) Inventors: Te-Chao Liao, Taipei (TW); Ying-Te Huang, Taipei (TW); Chao-Hsien Lin, Taipei (TW); Teng-Ko Ma, Taipei (TW); Ching-Yao Yuan, Taipei (TW); Chen-Ho Lai, Taipei (TW)

(73) Assignee: NAN YA PLASTICS CORPORATION, Taipei (TW)

( * ) Notice: Subject to any disclaimer, the term of this patent is extended or adjusted under 35 U.S.C. 154(b) by 203 days.

(21) Appl. No.: 15/655,980

(22) Filed: Jul. 21, 2017

(65) Prior Publication Data

US 2018/0034010 A1  Feb. 1, 2018

(30) Foreign Application Priority Data

Jul. 28, 2016 (TW) .............................. 105123840 A

(51) Int. Cl.
*H01M 2/02* (2006.01)
*H01M 10/052* (2010.01)

(52) U.S. Cl.
CPC ....... *H01M 2/0287* (2013.01); *H01M 2/0277* (2013.01); *H01M 2/0285* (2013.01); *H01M 10/052* (2013.01)

(58) Field of Classification Search
CPC ............. H01M 2/0287; H01M 2/0277; H01M 2/0285; H01M 10/052
USPC ........................................................ 429/176
See application file for complete search history.

(56) References Cited

U.S. PATENT DOCUMENTS

2016/0087250 A1* 3/2016 Gu ...................... H01M 2/0277
429/176

* cited by examiner

*Primary Examiner* — Gary D Harris
(74) *Attorney, Agent, or Firm* — Li & Cai Intellectual Property (USA) Office

(57) ABSTRACT

An aluminum plastic film packaging material for lithium batteries to prolong service life, at least comprising an inner layer and an aluminum foil layer, is performed an anti-corrosion treatment between the inner layer and the aluminum foil layer by one of the following ways:
1) a chromium-containing anti-corrosion layer is formed from an aqueous modified resin containing trivalent chromium; and
2) an adhesive layer with non-chromium material is formed from an aqueous modified resin, an epoxy curing agent, a silane coupling agent and a nano-sized metal oxide particle.

6 Claims, 3 Drawing Sheets

ALUMINUM PLASTIC FILM PACKAGING MATERIAL FOR USE IN LITHIUM BATTERY TO PROLONG SERVICE LIFE

BACKGROUND OF THE INVENTION

1. Field of the Invention

The present invention relates to an aluminum plastic film packaging material having a chromium-containing anti-corrosion layer having undergone a trivalent chromium modified treatment, and more particularly relates to lithium batteries formed from the aluminum plastic film packaging material is favorable to resist hydrofluoric acid (HF) and other solvent resistances, as well as to help the lithium batteries having a more longer service life.

2. Description of Related Art

With the trend toward compact and lightweight electronics, soft-packaging batteries have been extensively used in consumer electronics such as iPhone, iPad, Ultrabook and so on, and are further expected to be used in cell-driven vehicles or scooters and energy storage devices.

A common lithium battery typically uses an aluminum plastic film packaging material (hereinafter referred to as the APF packaging material). For preventing water ($H_2O$) from acting with lithium hexafluorophosphate ($LiPF_6$) in electrolyte to form hydrofluoric acid (HF) that can corrode aluminum foil and lead to a short circuit and even explosion of the battery, anti-corrosion treatment is necessary. Such anti-corrosion treatment for aluminum foil usually involves applying hexavalent chromium ($Cr^{6+}$) to the aluminum foil surface by means of coating or impregnation.

Besides, since nylon film is not resistant to electrolyte, in the event that electrolyte overflows during fill operation, the outmost layer of the packaging material tends to be corroded and whitened, the outmost material is preferably made by laminating a general polyester film with a nylon film for better protection.

For addressing the needs, some prior-art solutions have been proposed and are named bellow:

US Patent Publication No. 2015/0104698 discloses a packaging material for lithium batteries and a method for making the same. The packaging material has water, high temperature and corrosion resistance, and comprises a substrate layer, a binding layer, an aluminum foil layer, an anti-corrosion layer, an adhesive layer, and an inner layer. The prior-art device has aluminum foil applied with a conductive coating material act as the anti-corrosion layer. The adhesive layer with water, high temperature and corrosion resistance is made by mixing a OH-containing modified fluorocarbon resin and polyol, reacting the mixture with isocyanate to produce a fluorinated polyurethane polyol, and blending the fluorinated polyurethane polyol with a heat-resistant bisphenol epoxy resin to form a joint adhesive that has an interpenetrating network structure to be used in the packaging material for lithium batteries.

US Patent Publication No. 2010/0255365 discloses a packing material for a lithium cell, which has a first adhesive layer, an aluminum foil layer, a coating layer, an adhesive resin layer or a second adhesive layer, and a sealant layer laminated sequentially on one surface of a base material layer. The coating layer is a multilayer structure comprising a layer (A), in which 1 to 100 parts by mass of a phosphoric acid or a phosphate has been blended into 100 parts by mass of a rare earth element-based oxide, and a layer (X) which contains an anionic polymer and a cross-linking agent that causes cross-linking of the anionic polymers.

While the packing material for a lithium battery so produced has its resistance to hydrofluoric acid (HF) or solvents satisfying to the battery cell industry, with the enforcement of the EU's RoHS, WEEE and REACH, the use of hexavalent chromium ($Cr^{6+}$) is forbidden in more and more jurisdictions, and some European countries as well as the US have planned to fully prohibit the use of hexavalent chromium and other heavy metals in the future. Besides, the manufacturing of the prior-art packing material requires laminating a general polyester film with a nylon film, making the production process complicated and costly.

SUMMARY OF THE INVENTION

To address this problem, it is a primary objective of the present invention to teach an aluminum plastic film packaging material (or called APF packaging material) formed as a laminated structure comprising an inner layer made of a thin film of a polyolefin polymer or a polyolefin co-polymer and having a thickness ranging between 10 μm and 80 μm;

a substrate layer made of a custom polyester film or a nylon-polyester composite film and formed as an outmost layer of APF packaging material as well as having a thickness ranging between 10 μm and 50 μm;

an aluminum foil layer made of soft aluminum foil and jointed with the substrate layer as well as having a thickness ranging between 20 μm and 100 μm; and a first adhesive layer cured from an aqueous modified polyolefin resin and an epoxy curing agent and laminated between the inner layer and the aluminum foil layer.

The first adhesive layer of the APF packaging material is composed of the following components, based on the total weight of the components:

a) 96-99.5 wt % of an aqueous modified polyolefin resin; and b) 0.5-4 wt % of an epoxy curing agent.

The substrate layer of the APF packaging material is a polyester film made from a polybutylene terephthalate (PBT) film synthesized from at least two kinds of diprotic acids and diols, or alternatively made from a copolymerized thin-film copolymerized from the polybutylene terephthalate (PBT) with other polyester resins selected from one or any combination of polyethylene terephthalate (PET), poly trimethylene terephthalate (PPT), polyethylene naphthalate (PEN) or polybutylene naphthalate (PBN).

It is still a primary objective of the present invention to teach the aluminum plastic film packaging material further undergoes an anti-corrosion treatment between the inner layer and the aluminum foil layer by using one of the following ways to make the APF packaging material better resist to electrolyte and show good adhesive strength:

(1) a chromium-containing anti-corrosion layer is formed from an aqueous modified resin containing trivalent chromium ($Cr^{3+}$) and laminated between the adhesive layer adhered onto the inner layer and the aluminum foil layer; and (2) a second adhesive layer without trivalent chromium ($Cr^{3+}$) material is formed from an aqueous modified resin, an epoxy curing agent, a silane coupling agent and a nano-sized metal oxide particle and laminated between the inner layer and the aluminum foil layer to omit the chromium-containing anti-corrosion layer.

The chromium-containing anti-corrosion layer of the APF packaging material is formed from the following components:
a) 90-98 wt % of an aqueous modified resin, which is one or more selected from polyester resin, acrylic resin or fluorocarbon resin;
b) 1.5-9 wt % of phosphoric acid; and
c) 0.5-1.5 wt % of a trivalent chromium, which is one or more selected from chromium phosphate or chromium nitrate.

The second adhesive layer of the APF packaging material is composed of the following components, based on the total weight of the components:
a) 95-98 wt % of an aqueous modified polyolefin resin;
b) 1-4 wt % of an epoxy curing agent;
c) 0.2-1 wt % of a silane coupling agent; and
d) 0.01-0.05 wt % of a nano-sized metal oxide particle.

The aqueous modified polyolefin resin for use in the first adhesive layer or the second adhesive layer comprises one or any combination of aqueous modified polyethylene, polypropylene, polymethylpentene, polybutene and polyisobutylene, with a weight average molecular weight (Mw) of 15,000-40,000.

The silane coupling agent for use in the second adhesive layer may be one or any combination of phosphate ester functional-group silane, epoxy functional group silane, amino silane and vinyl functional group silane.

The silane coupling agent for use in the second adhesive layer is specifically formed from epoxy-based silane coupling agents combined with vinyl silane coupling agents, the preferred weight ratio of epoxy-based silane coupling agent to vinyl silane coupling agent is ranged from 2:1 to 8:1.

The nano-sized metal oxide particle for use in the second adhesive layer may be one or any combination of silicon dioxide ($SiO_2$), zirconium dioxide ($ZrO_2$), aluminium oxide ($Al_2O_3$), titanium dioxide ($TiO_2$) or cerium dioxide ($CeO_2$), and the nano-sized metal oxide particle have a particle size ranged between 10 nm and 100 nm.

According to the present invention, the disclosed APF packaging material and a method for making the same can be realized to simplify production, improve resistance to electrolyte and hydrofluoric acid, and streamline product structure, thereby lowering manufacturing costs. And, the APF packaging material of the present invention is suitable for use in lithium batteries having an excellent corrosion resistance and processability, and also helps the resulting lithium battery to prolong in terms of service life.

DETAILED DESCRIPTION OF THE INVENTION

In the present invention, an APF packaging material 10 has a laminated structure and is suitable for making APF packaging for lithium batteries. The APF packaging material 10 is suitably formed by cold stamping, and has proper elongation as well as higher impact strength, tear strength and breaking strength.

Figure 1:
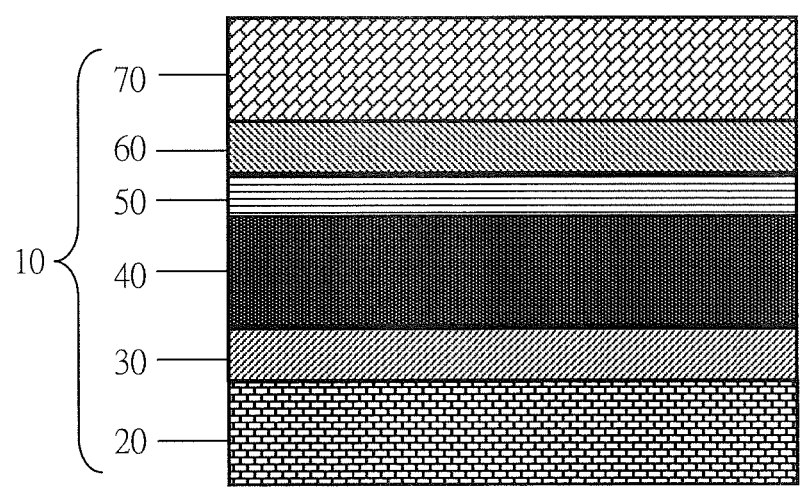
FIG. 1 is a first cross-sectional view of the laminated structure of an APF packaging material according to the present invention.

The APF packaging material 10 of the present invention has three alternative laminated structures. The first laminated structure of the APF packaging material 10 of the present invention, as shown in FIG. 1, comprises a substrate layer 20 made of a heat-resisting resin thin film, and on one side of the substrate layer 20, at least a binding layer 30, an aluminum foil layer 40, a chromium-containing anti-corrosion layer 50, an adhesive layer 60 and an inner layer 70 made of a thermoplastic resin thin film are laminated in order. Therein, the chromium-containing anti-corrosion layer 50 is laminated at one side of the aluminum foil layer 40 to make the aluminum foil layer 40 water-proof and acid-proof, so as to protect the aluminum foil layer 40 from corrosion.

Figure 2:
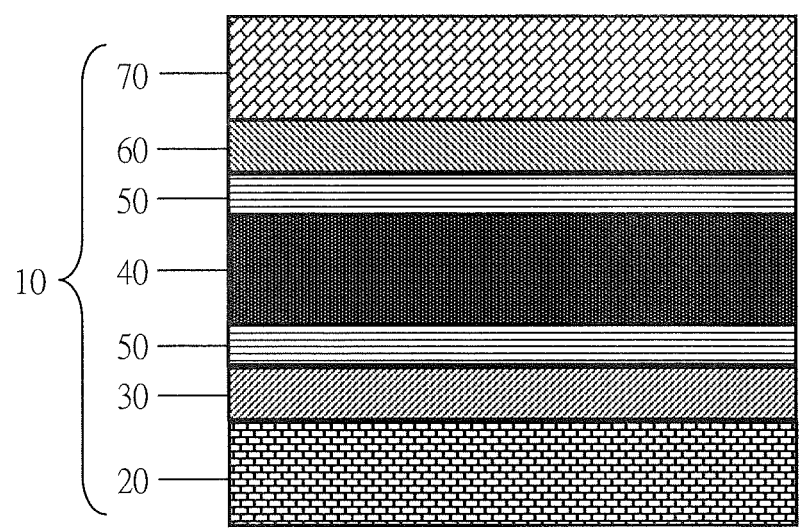
FIG. 2 is a second cross-sectional view of the laminated structure of an APF packaging material according to the present invention.

The second laminated structure of the APF packaging material 10 of the present invention, as shown in FIG. 2, is different from the first laminated structure by such a way that it has the aluminum foil layer 40 laminated the chromium-containing anti-corrosion layer 50 at both sides, so as to improve the aluminum foil layer 40 in terms of corrosion prevention.

Figure 3:
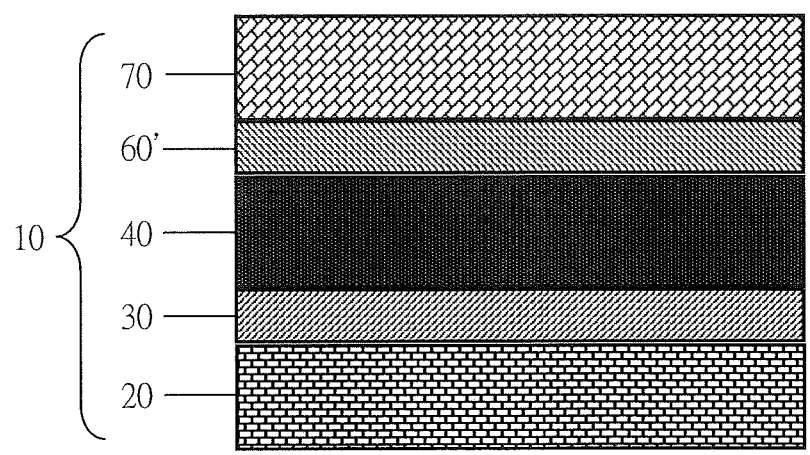
FIG. 3 is a third cross-sectional view of the laminated structure of an APF packaging material according to the present invention.

The third laminated structure of the APF packaging material 10 of the present invention, as shown in FIG. 3, is different from the first laminated structure by such a way that it has one side of the aluminum foil layer 40 attached by an adhesive layer 60' containing a non-chromium material, so that the aluminum foil layer 40 is water-proof and acid-proof, thereby protecting the aluminum foil layer 40 from corrosion.

The laminated structural composition of the APF packing material 10 of the present invention is further illustrated as follows:

1. Substrate Layer 20

As shown in FIG. 1, the substrate layer 20 is formed from a single-layer of or multi-layers of heat-resistant resin film(s), which is suitable for use in making as an outermost-layered material of lithium cells or batteries by a cold forming process.

The heat-resistant resin film is either a stretched or a non-stretched thin film made from either a polyamide (NYLON) resin or a polyester resin selected from the group consisting of a polyethylene terephthalate (PET), a polybutylene terephthalate (PBT) and a copolymer of PET and PBT.

The polyester resin may further add a polyamide elastomer as a polyester resin additive, and the polyamide elastomer may contain a polyether component, a polycarbonate component, or a polyester component.

The substrate layer 20 may be a polybutylene terephthalate (PBT) film which is synthesized from at least two kinds of diprotic acids and diols. Preferably, the diprotic acid is a dicarboxylic acid which is preferably 90-100 mol % of terephthalic acid, and the diol is preferably 90-97 mol % of 1, 4-butylene glycol, and a copolymerized diol can be used, such as ethylene glycol, 1, 3-propylene glycol, 1, 2-propylene glycol, neopentyl glycol, 1, 5-pentyl glycol, 1, 6-hexylene glycol or carbonate.

In addition, a copolymerized dicarboxylic acid may be used and selected from one or more of isophthalic acid, phthalic acid, naphthalenedicarboxylic acid, diphenyl dicarboxylic acid, cyclohexanedicarboxylic acid, hexanedioic acid, azelaic acid or decanedioic acid.

And, the substrate layer 20 may be a copolymerized thin-film which is copolymerized from the polybutylene terephthalate (PBT) with other polyester resins selected from one or any combination of polyethylene terephthalate (PET), poly trimethylene terephthalate (PPT), polyethylene naphthalate (PEN) or polybutylene naphthalate (PBN). The content of polybutylene terephthalate (PBT) is 60-80% by weight, and more preferably above 80% by weight. Where the content of polybutylene terephthalate (PBT) is below 60% by weight, the resulting copolymerized thin-film would have inferior impact strength and pin-hole resistance.

For clarity, the stretched or non-stretched thin film made from the polyamide (NYLON) resin is hereinafter referred to as a nylon film, and the stretched or non-stretched thin film made from the polyester resin is hereinafter referred to as a polyester film.

When lithium cells or batteries have the APF packing material 10 of the present invention formed as a plastic film packaging thereof, the main purpose of the substrate layer 20 of the APF packing material 10 is used to protect those intermediate layers including the aluminum foil layer 40, the chromium-containing anti-corrosion layer 50 and the adhesive layer 60 etc. And, the minor purpose of the substrate layer 20 is used to mark text for printing, so that the substrate layer 20 needs to have an excellent printability.

The substrate layer 20 is formed from a polyamide (NYLON) film or a polyester (PET) film with heat resistance and has a thickness of ranging between 10 microns (μm) and 50 microns by undergoing a cold forming process. The substrate layer 20 if having a thickness less than 10 μm has shortcomings in respects of insufficiency for elongation and reduction of insulation. Disadvantages will result in that the APF packing material 10 of the present invention is formed in unqualified forming. In addition, the substrate layer 20 if having a thickness more than 50 μm is unavailable for use in making a lithium battery required for having in light weight, thin thickness, short length and small size.

2. Bonding Layer 30

As shown from FIG. 1 to FIG. 3, the bonding layer 30 is used for bonding the substrate layer 20 and the aluminum foil layer 40. The bonding layer 30 is made from a polyurethane adhesive after completely cured.

3. Aluminum Foil Layer 40

Aluminum is smaller than iron and copper in terms of specific weight, making it perfect for light parts. By forming alloy with copper, magnesium, silicon, or iron, the aluminum foil layer 40 can have better strength.

Further, vapor or moisture existed in the air due to having a penetrative capability will penetrate into the interior of lithium cells or batteries easily and causes lithium cells or batteries to be unfavorable in working under normal condition, so that the life cycle of the lithium cells or batteries if under usage condition is so closely related to environmental atmospheric humidity. Thus, the APF packing material 10 of the present invention required for each laminated layer thereof having a property of moisture-proof is so extremely important, wherein the aluminum foil layer 40 used in the lithium cells or batteries plays a critical component to effectively prevent from penetration of water or moisture.

The aluminum foil layer 40 is limited to have a thickness of more than 20 microns (μm), preferably ranged between 30 μm and 100 μm, and if satisfied with the required condition has an excellent moisture-proof ability.

The aluminum foil layer 40 is generally made from a kind of soft aluminum foil. However, for giving the aluminum foil layer 40 possessing a preferable pinhole resistance as well as better scalability and formability, the aluminum foil layer 40 is preferably made from an aluminum foil containing iron element and silicon element. The iron content of the aluminum foil layer 40 is preferably between 0.1 wt % and 5 wt % by weight of the aluminum foil layer 40, most preferably between 0.3 wt % and 1 wt % thereof; and the silicon content of the aluminum foil layer 40 is preferably between 0.1 wt % and 5 wt % by weight of the aluminum foil layer 40, most preferably between 0.3 wt % and 1 wt % thereof.

The aluminum foil layer 40 is preferably treated with a degreasing treatment or a chemical conversion treatment to possess a high performance of hydrofluoric acid resistance. Said chemical conversion treatment for the aluminum foil layer 40 is meant that a layer of oxide coating is grown on the surface of the aluminum foil layer 40 thereof, the said oxide coating is made from chromates, phosphates or fluoride salts, such as alkali metal chromates, alkali metal phosphates, chromium phosphate, zinc phosphate or organic/inorganic silicon oxide ($SiO_2$) etc. Among them, chromates or phosphates are preferable and chromium phosphate is more preferable to produce the oxide coating grown on the surface of the aluminum foil layer 40 thereof.

4. Chromium-Containing Anti-Corrosion Layer 50

As shown in FIG. 1 or FIG. 2, the chromium-containing anti-corrosion layer 50 is made by spraying or applying an aqueous modified resin containing trivalent chromium ($Cr^{3+}$) over one or both sides of the aluminum foil layer 40 and curing the modified resin at high temperature.

The aqueous modified resin containing trivalent chromium ($Cr^{3+}$) is composed of the following components:

a) 90-98 wt % of an aqueous modified resin, which is one or more selected from polyester resin, acrylic resin or fluorocarbon resin;

b) 1.5-9 wt % of phosphoric acid; and c) 0.5-1.5 wt % of a trivalent chromium, which is one or more selected from chromium phosphate or chromium nitrate.

The aqueous modified resin containing trivalent chromium ($Cr^{3+}$), after cured at high temperature, is formed as a layer of dense metal oxide film having a thickness ranging between 20 nm and 100 nm at one or both sides of the aluminum foil layer 40, so that the electrode potential of metal in the aluminum foil layer 40 is in the passive region, resulted in that the aluminum foil layer 40 is thereby obtained protection from corrosion.

5. Adhesive Layer 60

As shown in FIG. 1 or FIG. 2, the adhesive layer 60 is made via chromium-containing anti-corrosion treatment, i.e., by applying an aqueous modified polyolefin resin and an epoxy curing agent together formed as an aqueous modified polyolefin resin joint adhesive (hereinafter referred to as a first aqueous joint adhesive), subsequently coated in between the chromium-containing anti-corrosion layer 50 and the inner layer 70, and then curing the first aqueous joint adhesive.

Alternatively, as shown in FIG. 3, the adhesive layer 60' is made via another non-chromium anti-corrosion treatment, i.e., by applying an aqueous modified polyolefin resin, an epoxy curing agent, a silane coupling agent and a nano-sized metal oxide particle together formed as an aqueous modified polyolefin resin joint adhesive (hereinafter referred to as a second aqueous joint adhesive), subsequently coated in between the aluminum foil layer 40 and the inner layer 70, and then curing the second aqueous joint adhesive.

The components of either the first or the second aqueous joint adhesive of the adhesive layer 60 or 60' is capable of being blended in different ratios and a proper amount of additives such as a curing agent is capable of being added to form an applicable and effective joint adhesive which is so suitably used to make the adhesive layer 60.

The first aqueous joint adhesive of the adhesive layer 60 is composed of the following components, based on the total weight of the first aqueous joint adhesive:
a) 96-99.5 wt % of an aqueous modified polyolefin resin; and
b) 0.5-4 wt % of an epoxy curing agent.

The second aqueous joint adhesive of the adhesive layer 60' is composed of the following components, based on the total weight of the first aqueous joint adhesive:
a) 95-98 wt % of an aqueous modified polyolefin resin;
b) 1-4 wt % of an epoxy curing agent;
c) 0.2-1 wt % of a silane coupling agent; and
d) 0.01-0.05 wt % of a nano-sized metal oxide particle.

The first or the second aqueous joint adhesive contains the aqueous modified polyolefin resin. Since C—C bonds of the aqueous modified polyolefin resin have outstanding chemical resistance and hydrophobicity, either the first or the second aqueous joint adhesive is highly resistant to hydrofluoric acid (HF) and can firmly bind the chromium-containing anti-corrosion layer 50 and the inner layer 70, or bind the aluminum foil layer 40 and the inner layer 70. With these features combined to the first or the second aqueous joint adhesive, the disclosed APF packaging material 10 of the present invention has good resistance to hydrofluoric acid (HF).

The modified polyolefin resin for use in either the first or the second aqueous joint adhesive may be one or more selected from the group consisting of polyethylene, polypropylene, polymethylpentene, polybutene and polyisobutylene. The modified polyolefin resin has a weight average molecular weight (Mw) ranged between 15,000 and 40,000, and preferably between 25,000 and 35,000.

To modify the polyolefin resin, graft copolymer(s), block copolymer(s) or low-molecular weight compound(s) is/are added into the molecule segment system as a compatiblizing agent. Addition of the compatiblizing agent makes two incompatible phases get synergy through physical effects or chemical reactions, thereby enhancing miscibility and improving performance of the modified system.

Selection of the modified polyolefin resin shall be made with its chemical inertness considered. The modified polyolefin resin must have superior resistance to those highly polar solvents, such as ethylene carbonate (EC), diethyl Carbonate (DEC), or dimethyl carbonate (DMC) solvents in the electrolyte, as well as possibly generated hydrofluoric acid (HF), and meanwhile the modified polyolefin resin must have superior adhesive property to either the inner layer 70 or the aluminum foil layer 40 too.

The epoxy curing agent for use in either the first or the second aqueous joint adhesive may be one or any combination of aliphatic amine, aliphatic cyclic amine, amidoamine, polyamide, and dicyandiamide.

The silane coupling agent for use in the second aqueous joint adhesive may be one or any combination of phosphate ester functional-group silane, epoxy functional group silane, amino silane and vinyl functional group silane.

Selection of the silane coupling agent shall be made with consideration regarding
1) whether to have high reactivity with metal surfaces of the aluminum foil layer 40;
2) whether to have good adhesion to either the inner layer 70 or the aluminum foil layer 40; and
3) whether to contribute the APF packaging material 10 of the present invention suitable to be formed by cold stamping and provided with proper elongation.

In case the silane coupling agent is specifically formed from epoxy-based silane coupling agents combined with vinyl silane coupling agents, the preferred weight ratio of epoxy-based silane coupling agent to vinyl silane coupling agent is ranged from 2:1 to 8:1. As the proportion of the epoxy-based silane coupling agent increases relative to the proportion of the vinyl silane coupling agent, the adhesive strength of the inner layer 70 and the aluminum foil layer 40 resistant to electrolyte improves significantly. Because the silane coupling agent formed from epoxy-based silane coupling agent combined with a proper amount of vinyl silane coupling agent, the C=C double bonds of the vinyl silane coupling agent can lead to polymerization, thereby increasing the anti-corrosion ability to the second aqueous joint adhesive of the adhesive layer 60' and effectively increasing resistance to hydrofluoric acid (HF). On the contrary, the silane coupling agent formed from epoxy-based silane coupling agent combined with an excessive amount of vinyl silane coupling agent, the C=C double bonds of the vinyl silane coupling agent can lead to polymerization with other molecules too much and then form a polymer having a high molecular weight, which is unfavorable to the adhesive quality of the second aqueous joint adhesive of the adhesive layer 60'.

The nano-sized metal oxide particle may be one or any combination of silicon dioxide ($SiO_2$), zirconium dioxide ($ZrO_2$), aluminium oxide ($Al_2O_3$), titanium dioxide ($TiO_2$), and cerium dioxide ($CeO_2$). The selected nano-sized metal oxide particle serves to remedy possible nano-sized pore defects in the anti-corrosion treatment and to improve corrosion prevention, thereby helping the inner layer 70 or the aluminum foil layer 40 resist electrolyte and have good adhesive strength.

The nano-sized metal oxide particle has a particle size ranged between 10 nm and 100 nm, and preferably between 20 nm and 50 nm.

6. Inner Layer 70

As shown from FIG. 1 to FIG. 3, the inner layer 70 is made from a single-layered or multi-layered thermoplastic resin film. The thermoplastic resin film is a polyolefin-based polymer film, a polyolefin copolymer film or a non-stretched film made from polypropylene, polyethylene, maleic-modified acid polypropylene, ethylene-acrylic acid ester copolymer or ionic bond-containing polymer resin.

Since the inner layer 70 is used to contact with electrolytes of a lithium battery, the inner layer 70 must have a capability of heat seal to improve electrolyte-resisted ability when assembled to the lithium battery.

The inner layer 70 has a thickness of ranging between 10 μm and 80 μm. The inner layer 70 has an adverse capability of heat sealing if having a thickness less than 10 μm, resulted in that the lithium battery has unavailable electrical properties. Furthermore, the inner layer 70 if having a thickness more than 80 μm is unavailable for use in making a lithium battery required for having in light weight, thin thickness, short length and small size.

The disclosed APF packaging material 10 is resistant to water, hydrofluoric acid (HF) and high temperature, and when made into the APF packaging material for lithium batteries, provides excellent corrosion resistance, processability and solvent resistance, and also effectively enhances the lithium batteries' service life.

The following examples are provided to illustrate the present invention without limiting the scope of the present invention. The physical properties of the APF packing material presented in the following Examples and Comparative Examples are evaluated by the following tests.

1. Evaluation of Press Formability

The samples obtained via the methods described above were cut to 150 mm*200 mm to undergo a cold forming process punched with a predetermined diameter punch. Based on the punched depth formed on the sample, the maximum punched depth of the sample is measured to evaluate whether the sample is capably undergone a cold forming process or not. The deeper punched depth measured thereof, the more available to the sample to undergo a cold forming process.

2. Evaluation of Electrolyte Solution Resistance by Proceeding Peel Strength Test An electrolyte solution was prepared by adding 1.0 M of $LiPF_6$ to a solution of ethylene carbonate/diethyl carbonate=1/1. The sample was then cut into strips of width 15 mm and dipped into the prepared electrolyte solution at temperature of 85° C. for 4 hours. To evaluate the peel strength (unit: N/mm) occurred between the aluminum foil layer and the innermost layer by a peel strength tester.

3. Evaluation of Package Capability

An electrolyte solution was prepared by adding 1.0 M of $LiPF_6$ to a solution of ethylene carbonate/diethyl carbonate=1/1. The sample obtained via the methods described above is carried out a heat seal after injected with the electrolyte solution. To confirm the electrolyte solution if leaked from the heat sealing sample after saved for one month.

Example 1

1. Preparation of Chromium-containing anti-corrosion layer for Aluminum Foil:
   (1) Degreased treatment: 5.0% NaOH aqueous solution was used to remove grease from the surface of the aluminum foil; and, water rinse and drying to the aluminum foil were subsequently performed.
   (2) Passivated coating: an aqueous modified resin solution containing trivalent chromium ($Cr^{3+}$) was applied or sprayed over the surface of the aluminum foil, so that the aluminum foil coated with a chromium-containing anti-corrosion layer having a thickness of 20 nm was obtained after drying.
2. Preparation of Joint Adhesive (A):
   (1) 100 parts by weight of an aqueous modified polyolefin resin (commercially available from Dow Chemical Company, weight average molecular weight (Mw)=30,000) and 1 parts by weight of an epoxy-containing curing agent (commercially available from Ya Chung industrial Corporation, Ltd., Taiwan) were added into a blending tank in order according to Table 1; and
   (2) a joint adhesive (A) was obtained after well mixing.
3. Production of aluminum plastic film (APF) packaging material:
   (1) a custom polyester film (commercially available from Toyobo Corporation, Ltd., Japan) having thickness of 25 μm was used as a substrate layer;
   (2) a polypropylene film having thickness of 40 μm was used as an inner layer;
   (3) a soft aluminum foil via post-passivation and having thickness of 40 μm was used as an aluminum foil layer;
   (4) an urethane binding agent (commercially available from Nan Ya Plastics Corporation, Taiwan) was used to bind the substrate layer with the aluminum foil layer at the face without the anti-corrosion treatment;
   (5) the joint adhesive (A) was used to adhere the inner layer to the aluminum foil layer at its surface with the chromium-containing anti-corrosion layer;
   (6) the laminate was ripened at 60° C. for 5 days to produce the APF packaging material.

The produced APF packaging material is analyzed and the detailed results are listed in Table 1.

Example 2

Referred to Table 1, the joint adhesive composition was used to have the epoxy-based curing agent added 2 parts by weight instead. The remaining parameters for making APF packaging material were all identical to those used in Example 1.

The produced APF packaging material is analyzed and the detailed results are listed in Table 1.

Example 3

Referred to Table 1, the joint adhesive composition was used to have the epoxy-based curing agent added 4 parts by weight instead. The remaining parameters for making APF packaging material were all identical to those used in Example 1.

The produced APF packaging material is analyzed and the detailed results are listed in Table 1.

Example 4

Same as the Example 3, except that a thickness of the chromium-containing anti-corrosion layer coated on the aluminum foil has changed from 20 nm to 100 nm. The remaining parameters for making APF packaging material were all identical to those used in Example 3.

The produced APF packaging material is analyzed and the detailed results are listed in Table 1.

Example 5

1. Preparation of Chromium-containing anti-corrosion layer for Aluminum Foil same as the Example 1.
2. Preparation of Joint Adhesive (B):
   (1) 100 parts by weight of an aqueous modified polyolefin resin (a product of Dow Chemical Company, Mw=30,000) and 3 parts by weight of epoxy-containing curing agent (commercially available from Ya Chung industrial Corporation, Ltd., Taiwan) were added into a blending tank in order according to Table 1 and well mixed;
   (2) 0.2 parts by weight of an epoxy functional group silane, 0.1 parts by weight of a vinyl functional group silane and 0.03 parts by weight of a nano-sized silicon dioxide ($SiO_2$), were added in order and mixed well; and
   (3) a joint adhesive (B) was obtained after well mixing.
3. Production of aluminum plastic film (APF) packaging material:
   (1) a custom polyester film (commercially available from Toyobo Corporation, Ltd., Japan) having thickness of 25 μm was used as a substrate layer;
   (2) a polypropylene film having thickness of 40 μm was used as an inner layer;
   (3) a soft aluminum foil with surface degreased treatment and having thickness of 40 μm was used as an aluminum foil layer;
   (4) an urethane binding agent (commercially available from Nan Ya Plastics Corporation, Taiwan) was used to combine the substrate layer with the aluminum foil layer;

(5) the joint adhesive (B) was used to combine the inner layer and the aluminum foil layer;
(6) the laminate was ripened at 60° C. for 5 days to produce the APF packaging material.

The produced APF packaging material is analyzed and the detailed results are listed in Table 1.

Example 6

In comparison with Example 5, the joint adhesive composition referred to Table 1 was used to have the epoxy functional group silane added 0.4 parts by weight instead. The remaining parameters for making APF packaging material were all identical to those used in Example 5.

The produced APF packaging material is analyzed and the detailed results are listed in Table 1.

Example 7

In comparison with Example 5, the joint adhesive composition referred to Table 1 was used to have the epoxy functional group silane added 0.8 parts by weight instead. The remaining parameters for making APF packaging material were all identical to those used in Example 5.

The produced APF packaging material is analyzed and the detailed results are listed in Table 1.

Example 8

In comparison with Example 6, the joint adhesive composition referred to Table 1 was used nano-sized aluminium oxide ($Al_2O_3$) to replace the nano-sized silicon dioxide ($SiO_2$), and the substrate layer was changed to the nylon composite film. The remaining parameters for making APF packaging material were all identical to those used in Example 6.

The produced APF packaging material is analyzed and the detailed results are listed in Table 1.

Comparative Example 1

1. Preparation of Aluminum Foil:
   (1) Degreased treatment: 5.0% NaOH aqueous solution was used to remove grease from the surface of the aluminum foil; and, water rinse and drying to the aluminum foil were subsequently performed.
2. Preparation of joint adhesive (A) was the same as Example 3.
3. Production of aluminum plastic film (APF) packaging material:
   (1) a custom polyester film (commercially available from Toyobo Corporation, Ltd., Japan) having thickness of 25 μm was used as a substrate layer;
   (2) a polypropylene film having thickness of 40 μm was used as an inner layer;
   (3) a soft aluminum foil with surface degreased treatment and having thickness of 40 μm was used as an aluminum foil layer;
   (4) an urethane binding agent (commercially available from Nan Ya Plastics Corporation, Taiwan) was used to combine the substrate layer with the aluminum foil layer;
   (5) the joint adhesive (A) was used to combine the inner layer with the aluminum foil layer;
   (6) the laminate was ripened at 60° C. for 5 days to produce the APF packaging material.

The produced APF packaging material is analyzed and the detailed results are listed in Table 2.

Comparative Example 2

1. Preparation of aluminum foil was the same as Example 3, except that the aluminum foil was coated with a chromium-containing anti-corrosion layer having a thickness of 10 nm.
2. Preparation of joint adhesive (A) was the same as Example 3.
3. Production of aluminum plastic film (APF) packaging material was the same as Example 3.

The produced APF packaging material is analyzed and the detailed results are listed in Table 2.

Comparative Example 3

In comparison with Example 5, the joint adhesive composition referred to Table 1 was used to have the epoxy functional group silane added 0.1 parts by weight instead. The remaining parameters for making APF packaging material were all identical to those used in Example 5.

The produced APF packaging material is analyzed and the detailed results are listed in Table 2.

Comparative Example 4

Same as the Example 6, except that the joint adhesive composition has no nano-sized metal oxide particle added. The remaining parameters for making APF packaging material were all identical to those used in Example 6.

The produced APF packaging material is analyzed and the detailed results are listed in Table 2.

Comparative Example 5

Same as the Example 6, except that the substrate layer was a nylon film having thickness of 25 μm to replace polyester film. The remaining parameters for making APF packaging material were all identical to those used in Example 6.

The produced APF packaging material is analyzed and the detailed results are listed in Table 2.

Comparative Example 6

Same as the Example 3, except that the aluminum foil was treated with hexavalent chromium ($Cr^{6+}$). The remaining parameters for making APF packaging material were all identical to those used in Example 3.

The produced APF packaging material is analyzed and the detailed results are listed in Table 2.

TABLE 1

| | Item | Example 1 | 2 | 3 | 4 | 5 | 6 | 7 | 8 |
|---|---|---|---|---|---|---|---|---|---|
| Substrate layer | Nylon film (25 μm in thickness) | — | — | — | — | — | — | — | — |
| | Nylon composite film (25 μm in thickness) | — | — | — | — | — | — | — | ✓ |
| | Polyester film (25 μm in thickness) | ✓ | ✓ | ✓ | ✓ | ✓ | ✓ | ✓ | — |
| Aluminum foil layer | degreased treatment | ✓ | ✓ | ✓ | ✓ | ✓ | ✓ | ✓ | ✓ |
| Cr Treatment | $Cr^{3+}$ modified Treatment | 20 nm | 20 nm | 20 nm | 100 nm | 20 nm | 20 nm | 20 nm | 20 nm |
| | $Cr^{6+}$ modified Treatment | — | — | — | — | — | — | — | — |
| Adhesive layer | Modified Polyolefin (parts by weight) | 100 | 100 | 100 | 100 | 100 | 100 | 100 | 100 |
| | Epoxy Curing Agent (parts by weight) | 1 | 2 | 4 | 4 | 3 | 3 | 3 | 3 |
| | Epoxy silane (parts by weight) | — | — | — | — | 0.2 | 0.4 | 0.8 | 0.4 |
| | Vinyl silane (parts by weight) | — | — | — | — | 0.1 | 0.1 | 0.1 | 0.1 |
| | Nano-sized $SiO_2$ (parts by weight) | — | — | — | — | 0.03 | 0.03 | 0.03 | — |
| | Nano-sized $Al_2O_3$ (parts by weight) | — | — | — | — | — | — | — | 0.03 |
| APF packing material physical property | Electrolyte solution resistance (N/15 mm) | 7.0 | 7.5 | 9.9 | 9.8 | 7.0 | 9.0 | 8.8 | 8.8 |
| | Appearance of substrate layer becomes discolored | no | no | no | no | no | no | no | no |
| | Maximum punched depth (mm) | ≥5 | ≥5 | ≥5 | ≥5 | ≥5 | ≥5 | ≥5 | ≥5 |
| | Press Formability | good | good | good | good | good | good | good | good |
| | Package Capability (no leakage) | good | good | good | good | good | good | good | good |
| | Overall evaluation | good | good | very good | very good | good | very good | very good | very good |

TABLE 2

| | Item | Comparative Example 1 | 2 | 3 | 4 | 5 | 6 |
|---|---|---|---|---|---|---|---|
| Substrate layer | Nylon film (25 μm in thickness) | — | — | — | — | ✓ | — |
| | Nylon composite film (25 μm in thickness) | — | — | — | — | — | — |
| | Polyester film (25 μm in thickness) | ✓ | ✓ | ✓ | ✓ | ✓ | ✓ |
| Aluminum foil layer | degreased treatment | ✓ | ✓ | ✓ | ✓ | ✓ | ✓ |
| Cr Treatment | $Cr^{3+}$ modified Treatment | — | 10 nm | 20 nm | 20 nm | 20 nm | — |
| | $Cr^{6+}$ modified Treatment | — | — | — | — | — | 20 nm |
| Adhesive layer | Modified Polyolefin (parts by weight) | 100 | 100 | 100 | 100 | 100 | 100 |
| | Epoxy Curing Agent (parts by weight) | 4 | 4 | 3 | 3 | 3 | 4 |
| | Epoxy silane (parts by weight) | — | — | 0.1 | 0.4 | 0.4 | — |
| | Vinyl silane (parts by weight) | — | — | 0.1 | 0.1 | 0.1 | — |
| | Nano-sized $SiO_2$ (parts by weight) | — | — | 0.03 | — | 0.03 | — |
| | Nano-sized $Al_2O_3$ (parts by weight) | — | — | — | — | — | — |
| APF packing material physical property | Electrolyte solution resistance (N/15 mm) | split | 6.0 | 4.5 | 6.5 | 8.8 | 9.6 |
| | Appearance of substrate layer becomes discolored | no | no | no | no | yes | no |
| | Maximum punched depth (mm) | ≥5 | ≥5 | ≥5 | ≥5 | ≥5 | ≥5 |

TABLE 2-continued

|  | Comparative Example | | | | | |
| Item | 1 | 2 | 3 | 4 | 5 | 6 |
| --- | --- | --- | --- | --- | --- | --- |
| Press Formability | good | good | good | good | good | good |
| Package Capability (no leakage) | — | good | good | good | good | good |
| Overall evaluation | very poor | poor | very poor | poor | poor | very good |

CONCLUSIONS

1. By comparing all Examples 1-8 to Comparative Example 1, it is thus clear that between the inner layer and the aluminum foil layer of the APF packaging material, if performed an anti-corrosion treatment by using one of the following ways, shall make the APF packaging material better resist to electrolyte and show good adhesive strength:
   (1) a chromium-containing anti-corrosion layer is formed from an aqueous modified resin containing trivalent chromium and laminated between the inner layer and the aluminum foil layer; and
   (2) an adhesive layer with non-chromium material is formed from an aqueous modified resin, an epoxy curing agent, a silane coupling agent and a nano-sized metal oxide particle and laminated between the inner layer and the aluminum foil layer.
2. As shown in Examples 1-3, with the increase of the epoxy curing agent in weight, the adhesive strength against electrolyte of the inner layer and the aluminum foil layer improved significantly. This is because the increase cross-link density effectively improved the resistance to hydrofluoric acid (HF).
3. By comparing Examples 3 and 4 to Comparative Example 2, it is clear that the aluminum foil chromium-containing anti-corrosion layer is preferably having a thickness ranged from 20 nm to 100 nm.
4. In Examples 5-7 and Comparative Example 3, as the proportion of the epoxy-based silane coupling agent is increased relative to the proportion of the vinyl silane coupling agent, the region between the inner layer and the aluminum foil layer had adhesive strength against electrolyte significantly improved. This is because that a proper amount of vinyl silane coupling agent with the C=C double bonds therein facilitating polymerization can increase the density of the non-chromium anti-corrosion treatment and then effectively improve resistance to hydrofluoric acid (HF).
   On the contrary, when vinyl silane coupling agent is excessive, the C=C double bonds of the vinyl silane coupling agent may lead to polymerization with other molecules too much and form a polymer having a high molecular weight, which is unfavorable to the adhesive quality of the adhesive layer through a non-chromium anti-corrosion treatment formed between the inner layer and the aluminum foil layer.
5. Examples 6 and 8 and Comparative Example 5 had nano-sized SiO2 or Al2O3 added to endow the inner layer and the aluminum foil layer with improved adhesive strength against electrolyte. This is because that nano-sized SiO2 or Al2O3 particles can remedy possible nano-sized pore defects in the non-chromium anti-corrosion treatment, thereby increasing corrosion prevention.
   Comparative Example 4 was made without nano-sized SiO2 and Al2O3, so its adhesive strength against electrolyte was inferior to that of Example 6.
6. In Example 3, the aluminum foil received a degreased treatment as well as a trivalent chromium ($Cr^{3+}$) anti-corrosion treatment.
   As compared to Example 3, the aluminum foil of the Comparative Example 1 only received a degreased treatment, but not chromium treatment. Resulted in that the inner layer and the aluminum foil layer of Comparative Example 1 were delaminated each other after exposed to electrolyte; and showed there was no adhesive strength between the inner layer and the aluminum foil layer.
   It is thus clear that the aluminum foil layer of the Comparative Example 1 was not resist to acid, due to not undergoing a chromium treatment.
7. In undergoing electrolyte-resisting tests, by comparing the substrate layers of Comparative Example 5 made of nylon film to of the Example 6 made of custom polyester film, respectively; the substrate layer of Comparative Example 5 discolored significantly.
   It is thus clear that the substrate layers made of custom polyester film of the Example 6 has good solvent resistance, outstanding capacity to punched-resistance and good processability.
8. The use of hexavalent chromium ($Cr^{6+}$) and other heavy metals is going to be forbidden in some European countries as well as the US.
   Example 3 was used trivalent chromium ($Cr^{3+}$) for the treatment of aluminum foil, while Comparative Example 6 was still used hexavalent chromium ($Cr^{6+}$) for the treatment of aluminum foil and used the same joint adhesive as Example 3 used.
   By comparing Example 3 to Comparative Example 6, it is thus clear that a chromium-containing anti-corrosion layer is formed from an aqueous modified resin containing trivalent chromium ($Cr^{3+}$) and laminated between the inner layer and the aluminum foil layer, which structural feature helps both the inner layer and the aluminum foil layer of the Example 3 having excellent adhesive strength against electrolyte as well as having outstanding capacity to punched-resistance, same as such Comparative Example 6 to undergo a hexavalent chromium ($Cr^{6+}$) modified treatment also have.
   Meanwhile, by means of introducing some non-chromium materials into the adhesive layer adhered between the inner layer and the aluminum foil layer, Examples 6 and 8 also have excellent adhesive strength against electrolyte as well as having outstanding capacity to punched-resistance, too.
   It is thus confirmed that the present invention discloses an anti-corrosion treatment is undergone either with a trivalent chromium ($Cr^{3+}$) modified treatment or with introducing some non-chromium materials to replace said trivalent chromium ($Cr^{3+}$) modified treatment can make the APF packaging material better resist to hydrofluoric acid (HF) effectively.

What is claimed is:

1. An aluminum plastic film packaging material having a laminated structure for use in lithium batteries, comprising:
   an inner layer, having a thickness ranging between 10 μm and 80 μm and made of a thin film of a polyolefin polymer or a polyolefin co-polymer;
   a substrate layer laminated as a outmost layer in order, having a thickness ranging between 10 μm and 50 μm, and made of a custom polyester film or a nylon-polyester composite film;
   an aluminum foil layer, having a thickness ranging between 20 μm and 100 μm, made of a soft aluminum foil and jointed with the substrate layer;
   a first adhesive layer, made by curing the following components at high temperature and laminated between the inner layer and the aluminum foil layer, based on the total weight of the first adhesive layer:
      a) 96-99.5 wt % of an aqueous modified polyolefin resin; and
      b) 0.5-4 wt % of an epoxy curing agent; and
   an anti-corrosion layer, made of a non-hexavalent chromium material composed of those components listed below and cured at high temperature, which is located between the aluminum foil layer and the first adhesive layer and has a thickness ranging between 20 nm and 100 nm, based on the total weight of the anti-corrosion layer:
      a) 90-98 wt % of an aqueous modified resin, which is one or any combination of a polyester resin, an acrylic resin or a fluorocarbon resin;
      b) 1.5-9 wt % of a phosphoric acid; and
      c) 0.5-1.5 wt % of a trivalent chromium, which is one or more selected from chromium phosphate or chromium nitrate.

2. The aluminum plastic film packaging material of claim 1, wherein the aqueous modified polyolefin resin of the first adhesive layer has a weight average molecular weight (Mw) of 15,000-40,000 and is one or any combination of aqueous modified polyethylene, polypropylene, polymethylpentene, polybutene and polyisobutylene.

3. The aluminum plastic film packaging material of claim 1, wherein the epoxy curing agent of the first adhesive layer is one or any combination of aliphatic amine, aliphatic cyclic amine, amidoamine, polyamide and dicyandiamide.

4. The aluminum plastic film packaging material of claim 1, wherein the custom polyester film of the substrate layer is a polybutylene terephthalate (PBT) film, a polyethylene terephthalate (PET) film, a copolymerized thin-film of PBT and PET, a copolymerized thin-film of PBT and poly trimethylene terephthalate (PPT), a copolymerized thin-film of PBT and polyethylene naphthalate (PEN), or a copolymerized thin-film of PBT and polybutylene naphthalate (PBN).

5. The aluminum plastic film packaging material of claim 1, wherein the custom polyester film of the substrate layer is further added a polyamide elastomer as a polyester resin additive.

6. The aluminum plastic film packaging material of claim 1, wherein the aluminum foil layer is treated with a degreasing treatment or a chemical conversion treatment.

* * * * *